United States Patent [19]
Katz

[11] Patent Number: 5,963,912
[45] Date of Patent: *Oct. 5, 1999

[54] TELEPHONE-BASED PERSONNEL TRACKING SYSTEM

[75] Inventor: Penina Katz, Flushing, N.Y.

[73] Assignee: MCI Communications Corporation, Washington, D.C.

[*] Notice: This patent is subject to a terminal disclaimer.

[21] Appl. No.: 08/728,921

[22] Filed: Oct. 11, 1996

Related U.S. Application Data

[63] Continuation of application No. 08/306,301, Sep. 14, 1994, Pat. No. 5,646,839, and a continuation-in-part of application No. 08/091,758, Jul. 14, 1993, abandoned, which is a division of application No. 07/529,894, May 29, 1990, Pat. No. 5,255,183.

[51] Int. Cl.⁶ .................................................. G06F 17/60
[52] U.S. Cl. ........................... 705/7; 379/913; 379/88.21; 705/32
[58] Field of Search ................... 705/1, 30, 32, 705/7, 9, 11; 235/375, 376, 377; 382/115; 379/913, 142, 93.01, 93.06, 88.2, 88.19, 88.21

[56] References Cited

U.S. PATENT DOCUMENTS 4,237,344  12/1980  Moore .
4,747,120  5/1988  Foley .
4,819,162  4/1989  Webb et al. .
4,956,861  9/1990  Kondo .
5,003,595  3/1991  Collins et al. .
5,008,930  4/1991  Gawrys et al. .
5,023,904  6/1991  Kaplan et al. .
5,077,788  12/1991  Cook et al. .

FOREIGN PATENT DOCUMENTS 1-221971  9/1989  Japan .
1-223587  9/1989  Japan .

*Primary Examiner*—Robert A. Weinhardt

[57] ABSTRACT

A computer system includes hardware for interfacing with the public telephone network and for accepting incoming telephone calls. The computer system detects from the incoming telephone calls automatic number identification data (ANI data), such as Caller-ID data, which identifies the calling telephone and further accepts personal identification codes from the caller. The system generates reports of the incoming telephone calls in which reports the location of the calling telephone is correlated with the person who is making the telephone call. Preferably, the system is applied for recording remotely, through the telephone network, the arrival and departure times of field based employees at various work sites.

17 Claims, 13 Drawing Sheets

| VOICE | RR 80 | OH 86 | LD | ENDF | TO | DTMF | EVENT STATE |
|---|---|---|---|---|---|---|---|
| SET ON HOOK | SET ON HOOK | SET ON HOOK | SET ON HOOK | SET ON HOOK | SET ON HOOK | SET ON HOOK | SET ON HOOK 70 |
| SET ON HOOK | SET ON HOOK | SET ON HOOK | SET ON HOOK | SET ON HOOK | SET ON HOOK | SET ON HOOK | WAIT CALL 64 |
| SET ON HOOK | SET ON HOOK | PLAY VOICE MESSAGE | SET ON HOOK | SET ON HOOK | SET ON HOOK | SET ON HOOK | SET OFF HOOK 66 |
| GET VOICE DATA | SET ON HOOK | SET ON HOOK | SET ON HOOK | PLAY BEEP | SET ON HOOK | GET DTMF DATA | PLAY VOICE MESSAGE 68 |
| GET VOICE DATA | SET ON HOOK | SET ON HOOK | SET ON HOOK | PLAY VOICE MESSAGE | SET ON HOOK | GET DTMF DATA | PLAY BEEP 74 |
| SET ON HOOK | SET ON HOOK | SET ON HOOK | SET ON HOOK | SET ON HOOK | PLAY VOICE MESSAGE | GET DTMF DATA | GET DTMF DATA 72 |
| GET VOICE DATA | SET ON HOOK | SET ON HOOK | SET ON HOOK | SET ON HOOK | PLAY VOICE MESSAGE | GET DTMF DATA | GET VOICE DATA 87 |

FIG. 4A

| SIL | EXIT | ON | TR1 | TR2 | TR3 | EVENT STATE |
|---|---|---|---|---|---|---|
| SET ON HOOK | EXITING | WAIT CALL | GET DTMF DATA | SET ON HOOK | SET ON HOOK | SET ON HOOK _70_ |
| SET ON HOOK | EXITING | SET ON HOOK | GET DTMF DATA | SET ON HOOK | SET ON HOOK | WAIT CALL _64_ |
| SET ON HOOK | EXITING | SET ON HOOK | GET DTMF DATA | SET ON HOOK | SET ON HOOK | SET OFF HOOK _66_ |
| SET ON HOOK | EXITING | SET ON HOOK | SET ON HOOK | SET ON HOOK | PLAY VOICE MESSAGE | PLAY VOICE MESSAGE _68_ |
| SET ON HOOK | EXITING | SET ON HOOK | SET ON HOOK | SET ON HOOK | SET ON HOOK | PLAY BEEP _74_ |
| SET ON HOOK | EXITING | SET ON HOOK | GET DTMF DATA | SET ON HOOK | PLAY VOICE MESSAGE | GET DTMF DATA _72_ |
| SET ON HOOK | EXITING | SET ON HOOK | SET ON HOOK | SET ON HOOK | PLAY VOICE MESSAGE | GET VOICE DATA _87_ |

FIG. 4B

| ENTRY | EXIT | T STATE |
|---|---|---|
| ON HOOK ENTRY 88 | ON HOOK EXIT 90 | SET ON HOOK 70 |
| WAIT CALL ENTRY 92 | WAIT CALL EXIT 94 | WAIT CALL 64 |
| OFF HOOK ENTRY 96 | OFF HOOK EXIT 98 | SET OFF HOOK 66 |
| PLAY FILE ENTRY 102 | PLAY FILE EXIT 104 | PLAY VOICE MESSAGE 68 |
| PLAY BEEP ENTRY 106 | PLAY BEEP EXIT 108 | PLAY BEEP 74 |
| GET DTMF ENTRY 110 | GET DTMF EXIT 112 | GET DTMF DATA 72 |
| GET VOICE ENTRY 116 | GET VOICE EXIT 115 | GET VOICE DATA 114 |
| EXIT | | EXITING |

TELEPHONE-BASED PERSONNEL TRACKING SYSTEM

This application is a Continuation Under Rule 1.60 of U.S patent application Ser. No. 08/306,301 filed Sep. 14, 1994, now U.S. Pat. No. 5,646,839.

This is a Continuation-In-Part of application Ser. No. 08/091,758, filed Jul. 14, 1993 now abandoned, which was a division of application Ser. No. 07/529,894, filed May 29, 1990, now U.S. Pat. No. 5,255,183, issued on Oct. 19, 1993.

BACKGROUND OF THE INVENTION

The present invention relates to a system which has the ability to note the presence of and/or the arrival and departure times of field based employees at various work sites, located remotely from their employer's main office. The system is designed to communicate and receive information from the field based employees through the telephone network. It is, in effect, a remotely operable, employee time clock system and will be referred to herein by its trademark Timeclerk™.

Automatic Number Identification (ANI) is a telephone related system and protocol by which the telephone number of the calling party is supplied to the premises of the called party, before the called party answers the telephone call. ANI has been instrumental in facilitating customer billing, and has gained increased importance recently, ever since telephone calls have begun to be more often routed through several, different telephone carriers.

The term "Caller-ID" refers in the art to an Automatic Number Identification system, which performs the same function as ANI, but with a different type of protocol and hardware. The Caller-ID system and protocol is well known to those skilled in the art and does not have to be described in detail herein. As reference, for example, note the Bellcore report entitled "Voiceband Data Transmission Interface Generic Requirements", which is identified as Technical Reference TR-NWT-000030, issued Oct. 2, 1992. For general information concerning Caller-ID one can contact Information Exchange Management, Bellcore, 445 South Street, Room 2J-125, P.O. Box 1910, Morristown, N.J. 07962, Telephone No. (201)829-4785.

It is known to use ANI to display the calling telephone number at the called telephone, as a means for enabling the called party to screen incoming telephone calls. Recently, proposals have been advanced for using ANI information for gathering data about the shopping preferences and other habits of individuals for purposes of telemarketing, financial services, home shopping and the like. The proposals are based on the assumption that the caller and the registered owner of the calling telephone are the same person.

Various other systems have been described in the prior art which enable individuals to communicate with central computers using passwords to gain access to the computers. Such computer systems have been used in the past for such diverse services as providing data base searching and for forwarding and receiving messages. In some existing computer systems, software has been provided to time the length of messages and to stamp the messages with time and date information.

Voice recognition systems are also in use. Such systems are used for extracing information from or entering information into voice response systems, especially where tones cannot be generated via the telephone. By using simple commands, such as 'yes' 'no', 'in', and 'out', digits etc. can be identified with some degree of accuracy.

Significant resources and costs are being invested by many businesses to keep track of the whereabouts and/or arrival and departure times of their field based employees, e.g. nurses, field technicians, delivery and repair personnel or the like, at various work sites such as the homes of patients or the like. Yet, the prior art has not recognized any need, purpose, desire, or advantage to use ANI and/or Caller-ID information and to correlate it with personal passwords, i.e. computer access codes. That is, the prior art has not conceived of the idea that using and correlating ANI and/or Caller-ID information with individual employee computer access codes enables determining the identity of and the present location of a calling employee, nor to use this information to automatically track the whereabouts of the employee, and generate reports of the number of hours spent by the employees at remote work sites.

Existing computer based systems for reporting the arrival and departure times of employees require manual intervention and are inherently prone to being abused. Further, present systems do not provide reliable and virtually instantaneously available reports on the work schedules of field employees, such as would enable businesses to complete the preparation of service bills and invoices much sooner.

SUMMARY OF THE INVENTION

Accordingly, it is a primary object of the present invention to provide a method and system for enabling tracking the whereabouts and arrival and departure times of field based employees.

It is a further object of the present invention to provide a system which is capable of generating daily, continuous or demand driven reports on the whereabouts and arrival and departure times of field based employees.

It is another object of the present invention to provide a system which enables employers to receive or forward messages to employees through the public telephone network, including voice messages or alphanumeric messages.

It is yet another object of the present invention to provide Point of Sales (POS) devices such as credit card readers, finger print reading devices, Radio Frequency devices, etc. as input devices for data that identifies the caller.

It is yet another object of the present invention to provide an automatic system which is capable of producing reports listing calling telephone numbers and work site of employees, alongside the names or other indicia which identifies the employees.

It is yet another object of the present invention to provide a time clock system for employees which can be accessed by field based employees by dialing an 800 toll free number, a 900 party line number, or any desired NNX-XXXX telephone number.

It is still a further object of the present invention to provide a system which enables field personnel to communicate with a central computer through a telephone network by entering coded messages via touch tone or rotary dial telephones or other suitable input devices.

It is also an object of the present invention to provide an especially designed, hand-held, pocket-sized and individualized device capable of generating telephone tones for communicating with a centralized computer and of identifying the caller.

Another object of the present invention is to provide a system to identify calling employees by, for example, voice recognition, recognizing finger prints of the calling employee, recognizing a radio frequency (RF) transmission emanating from a pendant or a watch worn by an employee.

It is yet another object of the present invention to provide a biometric system to verify or recognize the identity of a calling employee.

It is also an object of the present invention to use voice recognition systems to recognize a caller's voice and spoken commands, such as identification and function codes, and to match the voice and/or codes to the caller's identity either through voice print matches or through a specialized password system.

It is also an object of the present invention to provide a system capable of receiving messages and data, which may be sent by employees at remote locations through a telephone system.

A further object of the present invention is to provide employees with a rotary phone conversion device to enable employees to use rotary phones for calling the system of the present invention.

The foregoing and other objects are realized, in accordance with the present invention, by a method for tracking and generating employee reports which includes the main steps of: receiving telephone calls by means of a computer system from calling telephones located at various work sites; detecting calling number identification data which precedes the telephone calls; receiving from each of the calling telephones calling employee identification data which identifies the calling employee; providing an employee identification data base containing valid, i.e. predefined, employee identification data; verifying each received calling employee identification data against the data stored in the employee identification data base and accepting for inclusion in a separate section of a report described below authorized telephone calls; providing a telephone location data base; creating a telephone call record of each accepted telephone call and stamping each accepted telephone call record with a time and date mark; and generating a report containing information which defines for each telephone call record the location from which the telephone call was received, the time and date of the telephone call, and the identity of the employee.

Authorized telephone calls comprise calls received with preauthorized TD codes, or from preauthorized telephone numbers, or from preauthorized employees, or any combinations of these.

Preferably, the method of the present invention accepts telephone calls only from such employees whose personal identification data is included within the employee identification data base. The method of the present invention accepts a telephone call by granting the caller access to the system. Therefore, although the system will make a record in the client data base of all telephone calls that are received from calling parties, those calling parties who do not enter personal identification data which are included within the employee identification data base are not allowed access to the various interactive features of the system, i.e., the system does not accept such telephone calls.

Moreover, after identification of an employee information sent to the employee and received from the employee can be correlated at a central processing center with the identified employee thereby further enhancing the utility of the system.

In accordance with a further aspect of the present invention, the computer system receives from the calling telephones computer compatible function codes or employees' spoken commands which indicate whether an employee has just arrived or is presently departing from a work site. The report is generated with information indicating the arrival and departure time of the employee at the work site. Alternatively, the computer may indicate in the report the length of time spent by an employee at the work site.

In accordance with a further aspect of the invention, the computer system accepts telephone calls for inclusion in the report only from such telephone locations which are included in a valid ANI data base. The reports are generated on a daily basis. But they could be generated weekly or monthly or on demand.

Reports are sent to remote sites, i.e. employers, through asynchronous, synchronous or using WAN network off-the-shelf software.

In accordance with a further aspect of the present invention, each employee is provided with a palm size device which is capable of generating telephone tones, both for dialing the computer and for transmitting to the computer employee identification codes as well as function codes which indicate whether an employee has arrived or is departing from a work site. Preferably, the device is also operable to send to the computer an alphanumeric message which has been prestored in the device by the employee, if desired. When recognizable tones cannot be mechanically generated by the calling employees, the system is able to receive the identification or function codes from a voice recognition system which interprets codes spoken by the employees into the telephone. Each employee may also be provided with a device which is capable of generating data that defines particularized characteristics of a calling employee.

Other features and advantages of the present invention will become apparent from the following description of the invention which is provided below in relation to the accompanying drawings.

BRIEF DESCRIPTION OF THE DRAWINGS

FIGS. 4A and 4B are state transition tables which define various states assumed by the software program of the present invention and further defines "events" which determine how the software program moves from one state to another.

DETAILED DESCRIPTION OF THE DRAWINGS

Figure 1:
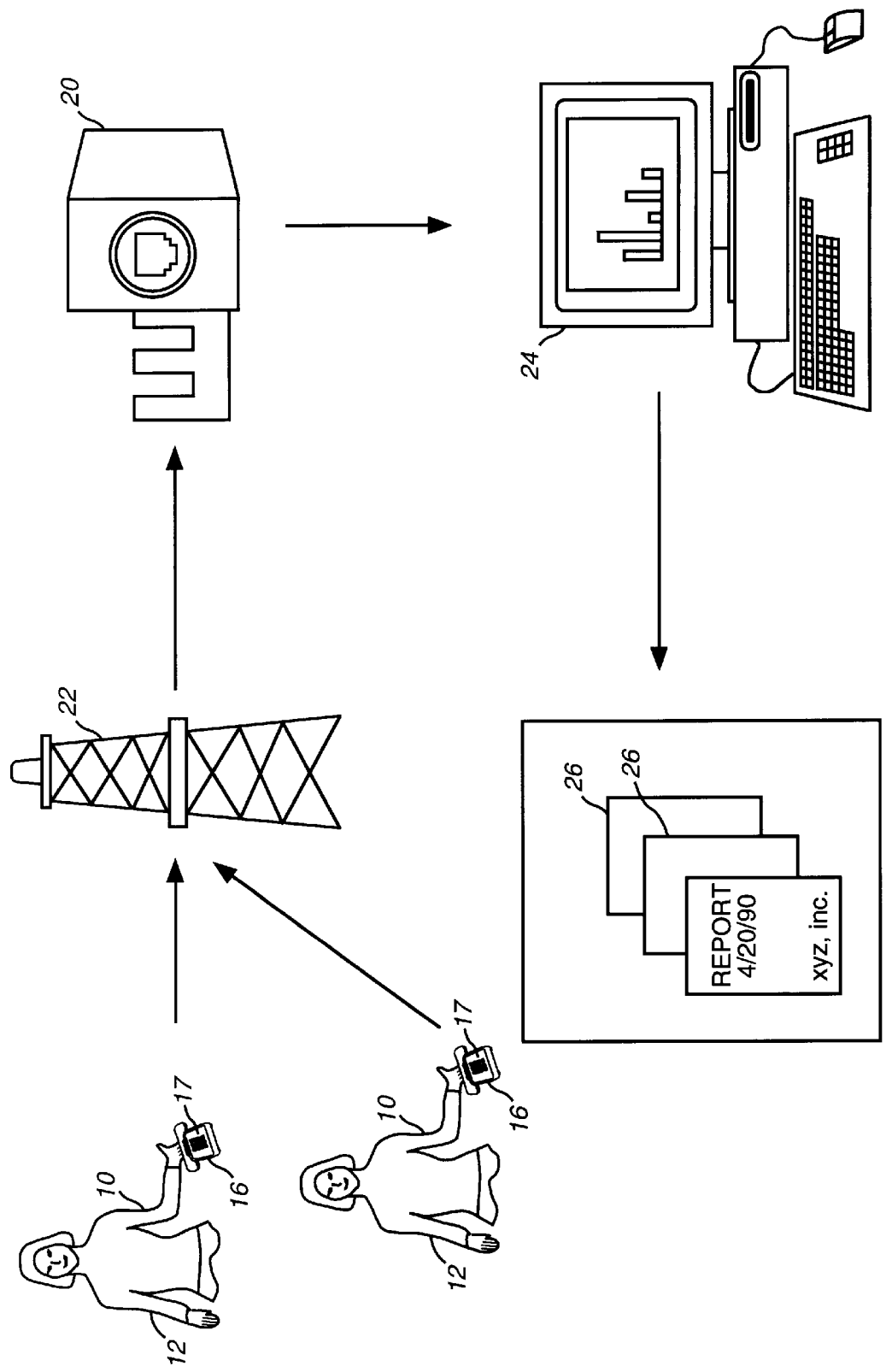
FIG. 1 is a schematic overview of the overall concept of the Timeclerk™ of the present invention.

Referring to the drawings, FIG. 1 illustrates the overall concept of the present invention in accordance with which field based employees 10 and 12 are shown symbolically inserting employee time cards 14 into telephone sets 16. In actuality, the employees 10, 12 communicate by entering calling employee identification data into the telephones 16. For example, calling employees can enter information such as individual access codes and other codes that designate whether they have arrived or are departing from a work site through the touch tone key pad 17 or, if not available, through the rotary dial of telephones 16 or by speaking into the telephones 16. Calling employee identification data can also be entered into the telephones 16 by various devices provided to the calling employees, as discussed in more detail below. Such information is then communicated from the telephone sets 16 to the telephone company's central office 20, via the telephone network 22.

Located within or off premises relative to the central office 20 is a computer 24 which receives the telephone calls and processes the information transmitted by the telephones 16. The computer 24 then generates various reports 26. These reports 26 are configured so that they provide for each employee daily arrival and departure time information. Essentially, the reports 26 are in the form of daily logs, which list the arrival and departure times of various employees, of one or several different companies or divisions, optionally, at more than one work site. Optionally, the reports also list employees that were expected to but did not call in and other invalid calls. Preferably, the reports 26 list each employee's name, work site address as well as other particulars about the employee, e.g. employee number, employment category, etc., as a customer for the services of the present invention might desire or define.

The reports 26 may also be print-outs of information sent by the calling employees and received by the computer 24.

While the reports 26 are shown in FIG. 1 as consisting of hard copy output, the same may also consist of electronically stored information, e.g. data stored on hard or flexible magnetic storage medium or data stored in semiconductor memory, or any other form of data storage.

Figure 2:
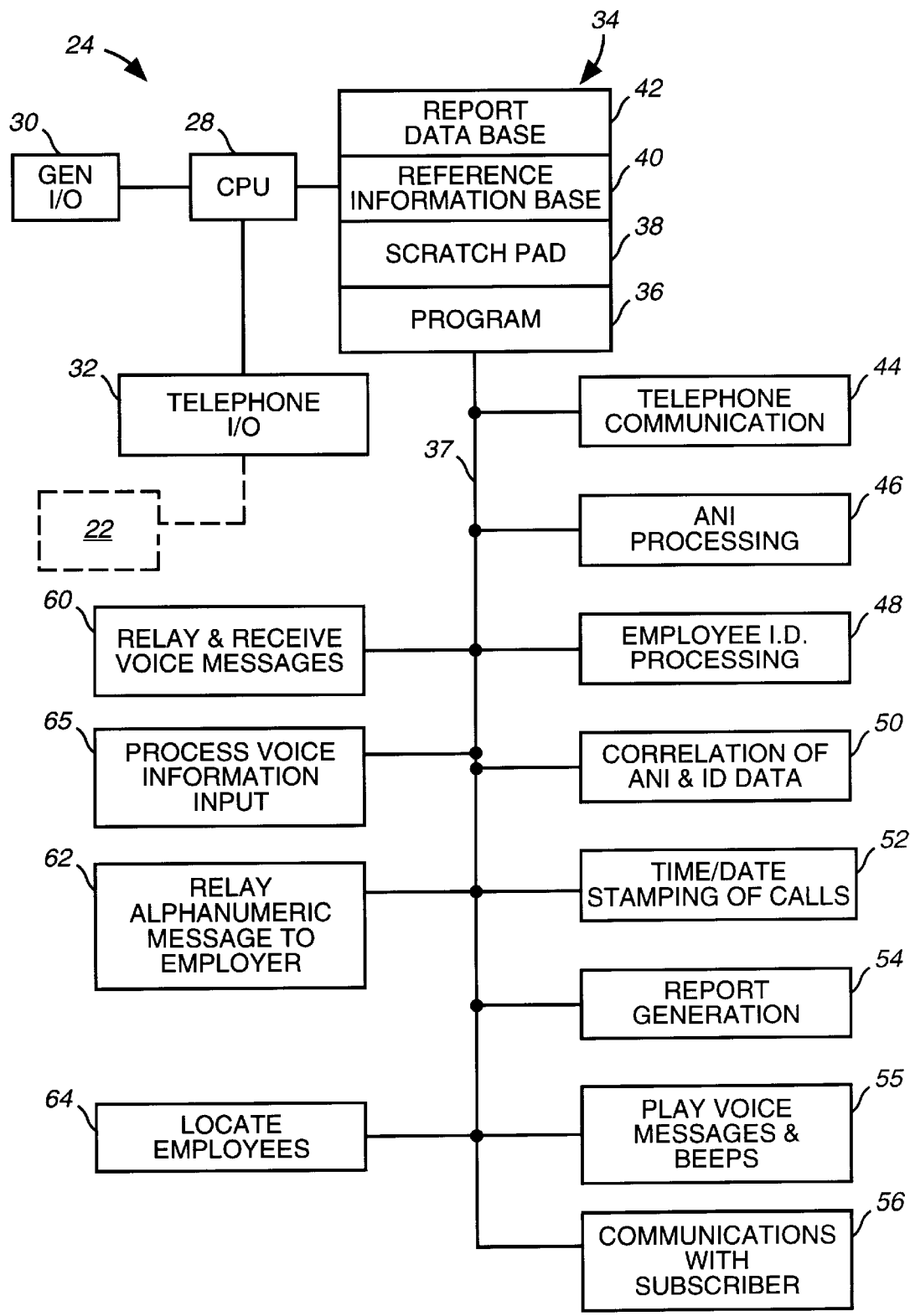
FIG. 2 is a block diagram of the basic hardware and major software blocks which comprise the present invention.

As seen in FIG. 2, the computer 24 is comprised of a CPU 28, general I/O (Input/Output) circuitry 30 for communicating with a computer keyboard (not shown) and with other standard computer peripherals, telephone I/O hardware 32 by which the CPU 28 is capable of placing and receiving telephone calls over the telephone network 22, and a memory 34.

The memory 34 is associated with a program 36, a working memory, i.e. scratch pad memory 38, a block of memory locations for a reference information data base 40, and a further memory area 42 for the storage therein of data and reports generated by the program 36. The program 36, as is well known by persons skilled in the computer arts, consists of especially prepared computer instructions which determine the overall flow as well as specific details of the sequence, flow, and organization of the functions carried out by the computer 24. The program 36 also includes instructions for communicating with standard, off the shelf application programs available from various vendors, for example, application programs which control the telephone I/O circuitry 32 and data base handling software programs.

In an embodiment of the present invention which has been reduced to practice, the telephone I/O hardware 32 comprises one or more DIALOGIC 4XX, or 2XX multi-line voice communication system boards or Dialogic VR/10 Speaker Independent Voice recognition board and Unix Voice Driver and DIALOGIC's MF daughterboard and DIALOGIC's DTI 124. These boards are designed to operate with an IBM compatible line of personal computers, or similar computer systems, and are available from the Dialogic Corporation of Parsippany, N.J. The DIALOGIC 4XX and 2XX multi-line voice communication system boards relieve a system designer from the tasks of having to freshly design various software and hardware for communicating over telephone lines. These boards are known in the art, are capable of handling multiple tasks simultaneously, i.e. to simultaneously receive and process information from a number of telephones, and need not be described in detail. A description of the DIALOGIC telephone and voice communication hardware and software including its Voice Communications System, Multi-Line, Digital Telephoning Interface, MF Interface boards, and Voice Recognition hardware and software is contained in DIALOGIC data sheets which can be obtained by dialing 201-334-8450 or writing to Dialogic Corporation, 300 Littletown Road, Parsippany, N.J. 07054.

In the aforementioned embodiment of the present invention which has been reduced to practice, the software package known under the trade name Vbase/40, which is also available from the Dialogic Corporation, has been used in conjunction with the aforementioned DIALOGIC/40 hardware.

More specifically, as indicated by the line 37, the program 36 is comprised of main software blocks and functions including a software block 44 which contains the program instructions for receiving and/or placing telephone calls over the telephone network, via the telephone I/O hardware 32. Essentially, this program block 44 is responsible for initializing the telephone I/O hardware 32 (the DIALOGIC 4XX or 2XX boards) and for initiating and permitting telephone communications to proceed.

The software routine in block 46 is responsible for receiving from the telephone I/O hardware 32 ANI (Automatic Number Identification) data by which the program 36 determines the origin of the telephone call, or in other words, the location from which the telephone call is originating. Preferably, but not necessarily, the ANI information is used to screen incoming calls by comparing incoming ANI data with information stored in the reference data base 40. As previously discussed, a "Caller-ID" system and protocol may be used to identify the location from which the telephone call received by the system is originating. This feature enables the present invention to validate telephone calls originating from preauthorized calling telephones. It is also used to store and track calls from other than preauthorized calling telephones or, if desired, to reject such calls.

The software block 48 is responsible for receiving from the calling telephones 16, via the telephone I/O hardware 32, employee identification information which the employees enter through the touch tone keypad or rotary dial 17 of the telephones 16 or by speaking into the telephones 16 (FIG. 1). The identification ("ID") information, like the ANI information, is preferably verified against reference data contained in the reference data base 40, to screen or reject unauthorized telephone calls. The identification information may also be entered using hand-held or other portable devices provided to the employees. Such devices are discussed below.

The capability to recognize a calling employee's voice is provided by software and hardware using a voice recognition system. The voice recognition system allows for either continuous speech or discrete speech patterns. After a spoken word is recognized as being in a specified language, i.e. English, French, Spanish or a dialect threof, the voice recognition system matches it for a correct command, and then matches the spoken word with previously recorded voice prints. The voice recognition system identifies the unique signature of the spoken word.

For example, when a call is placed from a device which cannot generate tones that are recognizable by the system (i.e., rotary phones) the capability to recognize the voice of the calling employee is accomplished by software block 65. Using, for example, the Dialogic hardware, each digit representing the identification ("ID") information is accumulated in memory for later processing. The function ID (i.e. "in" or "out") commands are also decoded. When the decoding fails, a user is prompted to reenter the identification digits as necessary.

The software routine 50 is responsible for correlating the ID data with the ANI data, with respect to each call. This information is stored for later use in developing the reports 26 and is also optionally used to insure that the calling employee is calling from the telephone location where he or she has been prescheduled to appear. Alternatively, information that a certain employee has appeared at other than the predesignated location might be relayed immediately to the employer to whom the receipt of such information might be valuable.

Upon verifying that the correct ANI and ID information have been received, a computer record is generated of the call. This record is stamped with a time and date indicia and preferably with further indicia which indicate (in response to an appropriate entry made by the field employee) whether the record pertains to an arrival or departure of the employee from the particular work site. This function is carried out at the software block 52.

At the conclusion of each day and/or any other desired or predefined reporting period, the software program 36 generates (within the software block 54) various reports 26 for the employees of one or several companies, indicating and/or providing a list of the arrival and departure times of each employee and the place where services have been performed. This information is stored in the data base 42.

The information in the data base 42 is then forwarded (see the software block 56) to subscribers or users of the present invention as hard copy output (as shown in FIG. 1) or electronically through a telephone link or through a direct computer connection. The reports can be sent either asynchronously, synchronously or through WAN networks. Standard off the-shelf packages are used to transmit the data.

Another major function of the program 36 includes generating and playing various voice messages and beeps (at the block 55) which serve to direct and prompt the calling employee to enter the correct codes and information.

A further function provided by the program 36 involves receiving and/or sending voice messages to and from employers and their employees. That is, the software block 60 is designed to receive from the employers alphanumeric (ASCII) information comprising short messages which the software block 60 is configured to convert, by means of voice synthesizing circuitry (presently available from the Texas Instruments Company), to voice messages which are then played to one or more employees, at their current work site. It is contemplated that such messages will be used to inform employees of their upcoming work assignments, for the next day or for several coming days. On the other hand, a call could be initiated by an employee wishing to leave a short message of, for example, about 10–15 seconds (to limit memory usage). Such a message is received by the software block 60, digitized, stored, and later forwarded to the employer.

The software block 62 serves the function of receiving from employees and sending to employers alphanumeric messages which will be inputted by employees (in accordance with one embodiment of the invention) through a special device 100 (see FIG. 6), described further on. The device 100 obviates the need to manually enter information and allows the computer 24 to generate ASCII messages which could be far more easily stored and relayed to employers, in a more organized fashion.

The software block 62 provides the ability to call various work sites in response to requests from employers to check whether the designated employee is present at the particular work site. For this purpose, calls are initiated by the computer 24. During such calls, the employee is prompted, through the playing of appropriate voice messages, to enter his or her individual access code as well as other codes designating the presence of the called employee at the particular work site. The software block 64 also operates in certain modes to place calls to work sites to verify the presence of an employee who has failed to call in. Preferably, voice messages are played which direct the employee how to enter their arrival time through the key pad 17.

Figure 3:
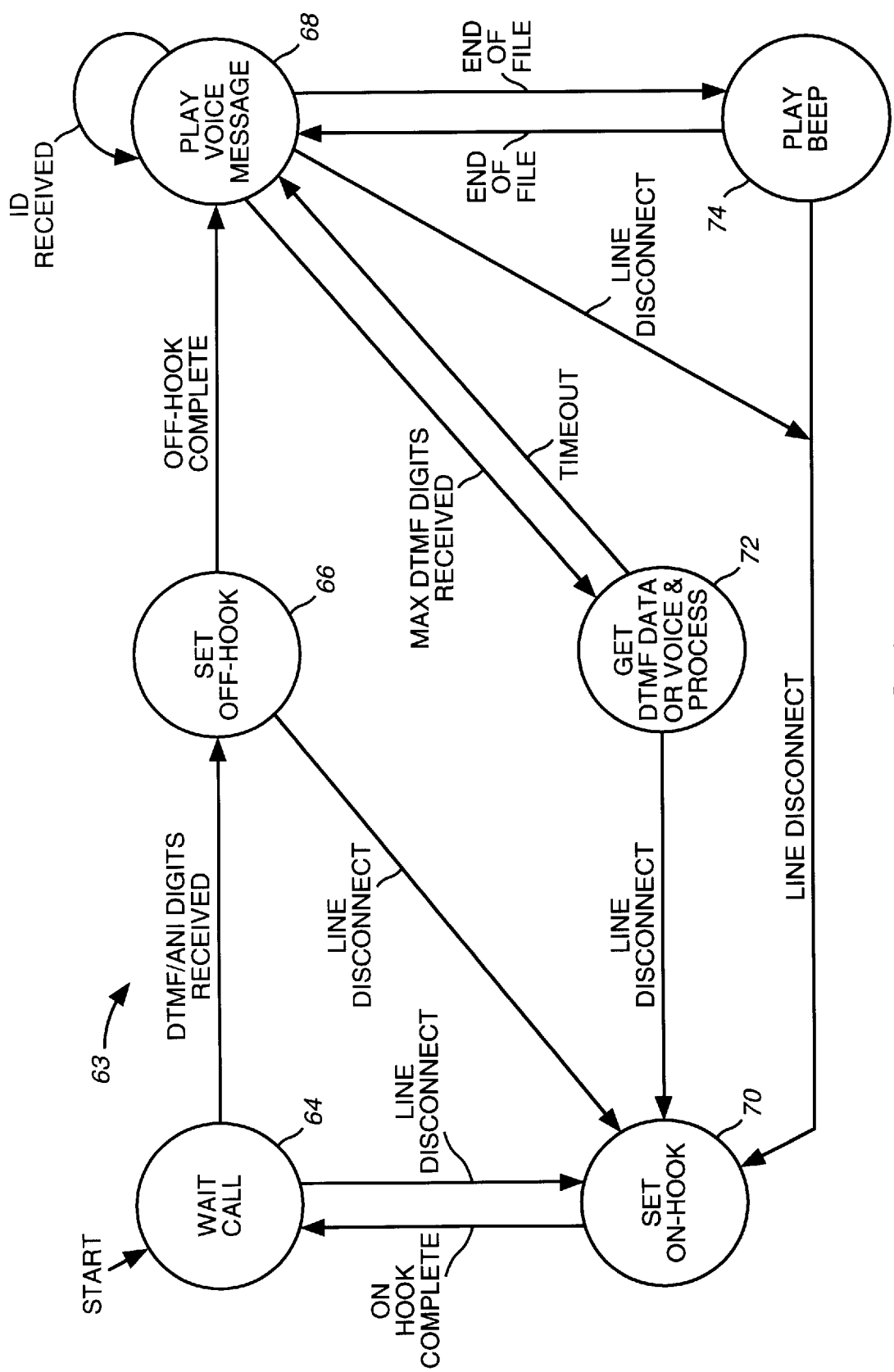
FIG. 3 is a state transition flowchart of a major constituent of a software program of the present invention.

FIG. 3 depicts a state transition table 63 which relates to portions of the program 36 that involve responding to and handling incoming telephone calls and data. Thus, at first, after performing an initialization routine, the program 36 enters a wait call state 64. Normally, a telephone set or channel is in an "on hook" condition at which condition the telephone is ready to receive incoming calls. When the tip and ring wires of a telephone indicate an incoming call, the telephone answers the call by going "off hook".

The software program 36 remains in the "wait call" state 64 while awaiting an incoming call. When a call is placed, the incoming call is preceded by ANI information, in a form of a plurality of digits identifying the calling telephone number. In accordance with telephone company protocol, this information is received as a dual tone multiple frequency (DTMF) or as a MF signal which signal is then decoded in the telephone I/O hardware 32 and processed by the CPU 28. After the ANI information has been received and, preferably, after having verified that the call is originating from an authorized telephone, the program 36 proceeds to the "set off hook"state 66. In state 66, the program 36 sets up the hardware to the off-hook condition, i.e. the call is answered and the software is readied to receive information originating from the telephones 16, e.g. the employee identification code. The program 36 then proceeds to the "play voice message" state 68 at which the software in block 55 is exercised to play voice messages which direct the telephone caller to enter his or her identification access code.

In response, when the employee will have operated the touch tone pad 17, the program 36 proceeds to the state 72 where it receives and verifies the incoming DTMF data against information which is contained in the reference data base 40. However, when the employee does not call from a telephone having a touch tone pad, and the program receives a voice activation, the program proceeds to the state 87 where it receives and verifies incoming spoken digits against information that is contained in the data base 40.

If the caller fails to enter any information or does not complete entry of all of the necessary information within a preset time period, the program returns to the state 68 and plays an appropriate message. If after a set time or a number of tries the correct information is still not received, the program 36 progresses to the "play beep" state 74 at which it sounds a beep indicating that the call is being terminated.

At all times, and regardless of the state of the program 36, the telephone I/O hardware 32 monitors whether the incoming telephone connection has been disconnected at the source for any reason. If it has, a "line disconnected" flag is activated and the program 36 transfers unconditionally to the "set on hook" state 70. There, appropriate procedures are executed which set the telephone I/O hardware 32 in the "on-hook" condition. Thereafter the program returns to the "wait-call" state 64.

Referring now to FIGS. 4A and 4B, the various states (FIG. 3) of the program 36 are presented in these figures as tables in which the program states are presented against "events" which trigger the program 36 to transfer from one state to another. In essence, FIGS. 4A and 4B denote with greater particularity the events, i.e. conditions, (corresponding to the arrows in FIG. 3) which prompt the program 36. Thus, when the program is in the "wait call" state 64, the event designated RR (received ring) 80 causes the program to transfer to the "set off hook" state 66. Similarly, the event OH (off-hook) 86 (designating completion of setting up of the "off hook" state) causes the program 36 to leave the state 66 and enter the state "play voice message" 68.

In FIGS. 4A and 4B, RR designates "received ring"; OH denotes "off-hook procedure completed"; LD represents "line disconnected"; ENDF represents "end of play file reached"; TO represent "time-out" (while waiting for DTMF digits); DTMF represents "received DTMF digits" and SIL denotes "silence" during play file which results in transferring of the program 36 to the "set on hook" state 70 from all states. Other events include: EXIT representing "exit event"; ON denoting "ON HOOK"; TR1 representing "ANI digits received"; TR2 representing "exit event 2"; and TR3 denoting "play file event", GET VOICE DATA 87 represents an incoming spoken digit recognized by the hardware.

Figures 5, 6:
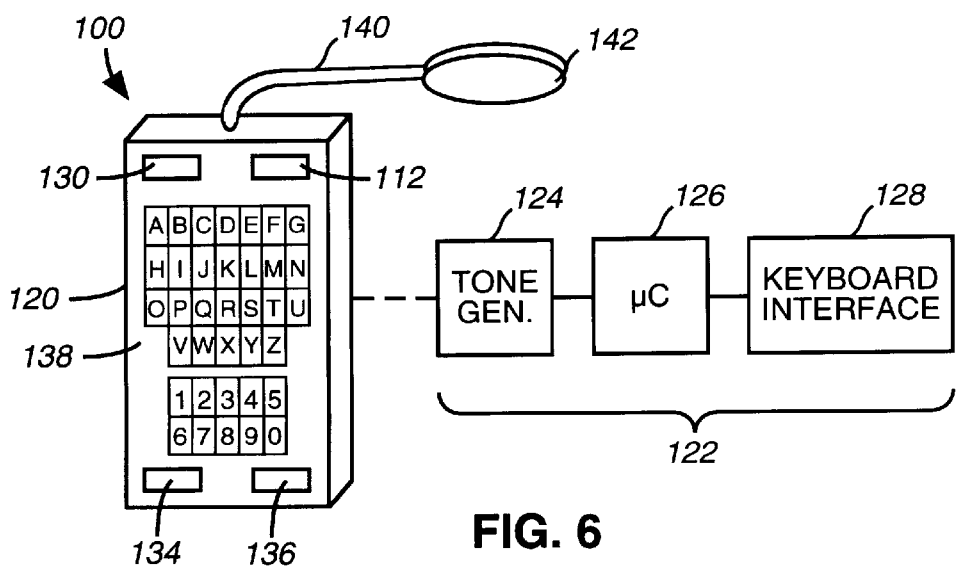
FIG. 5 is a table which identifies software routines associated with the state transition tables of FIGS. 4A and 4B.
FIG. 6 is a schematic of a secure computer accessing device by which employees may communicate securely through a telephone with the system of the present invention.

In transferring from one state to the next, the program 36 executes special entry and exit routines, as shown in FIG. 5. Thus, for example, as the program 36 enters the state "set on hook" 70, the routine "on hook entry" 88 is executed. Similarly, the routine "on hook exit" 90 is executed when the program 36 exits the state "set on hook" 70. Details of these entry and exist subroutines are provided further on.

It should be noted that since the DIALOGIC 4XX or 2XX board, which is used in the telephone I/O hardware 32, contains several channels for simultaneously handling a plurality of telephone calls, the program 36 maintains the aforementioned states and executes the routines simultaneously and independently for the various telephone channels.

In FIG. 5, the "on hook entry" subroutine 88 sets the hardware of a corresponding telephone channel of the DIALOGIC 4XX or 2XX board to "on hook". Upon leaving the "set on hook" state 70, the "on hook exit" subroutine 90 is executed to create a transaction record of the particular telephone call which is date/time stamped. Preferably, the date/time stamp reflects the ending time of the telephone call. It also indicates whether the record pertains to the employees' arrival at or departure from the work site. This record is then stored at the report data base 42 by a software procedure which is called "WRITE RCD". The "WRITE RCD" is one of a number of software routines which are called upon and executed in conjunction with the software routines identified in FIGS. 2, 3 and 5. "WRITE RCD" is part of the software block 54 of FIG. 2. It serves to generate a record for the report 26 in data base format. This routine comprises an off shelf software package which is able to generate a data base record, which record is in a form usable by a standard software package such as the DBASE III Plus database programming language available from Ashton Tate, or any other compatible software language.

The "wait call entry" subroutine 92 clears any DTMF digits that may be present in the memory of any given channel of the DIALOGIC 4XX or 2XX board. The "wait call exit" subroutine 94 does not perform any particular function except for transferring program control to the next state.

Functions performed by the other subroutines of FIG. 5 and other software routines which are associated with the program 36 are as follows:

"Off hook entry" routine 96 is the entry software routine which establishes the "set off hook" state 66, of the channel being handled, unless a "line disconnect" flag is raised.

The exit function for the "set off hook" state 66 is controlled by the routine "off hook exit" 98. The telephone call transaction record is date and time stamped to reflect the start time of the call. A "complete" field within the telephone record is set to the character "N" to indicate non-completion of the call, when appropriate.

The routine 98 initializes a buffer in the DIALOGIC 4XX or 2XX board to indicate that no DTMF digits have as yet been received. The routine 98 also initializes the voice message files to set them up to play an introductory voice message and is further involved in initializing certain counters within the software, e.g. a counter which counts the number of times a message has been repeated.

The "play file entry" subroutine 102 is the entry function subroutine for the "play voice message" state 68. Each time a voice message is to be played, a count of the number of times a voice file has been played is incremented. If the voice file has been played more than a maximum allowable number of times, a different voice file is played which informs the user that the call is being terminated. A further subroutine named "PLAY" is called to actually play the voice message.

A voice file is kept as a global structure for use by the various channels in the system. The "PLAY" software opens the file to be played and interfaces with an RWB buffer of the DIALOGIC 4XX or 2XX hardware to set the parameters desired for playing a particular voice file. Then the voice message is played.

The exit function for the "play voice message" state 68 is called "play file exit" 104. The voice file is closed by this routine and the subsequent function performed by it is dependent on the type of voice file just played. If the introduction voice file has just been played, then the next voice file played instructs the employee to enter the ID data. Thereafter, a test is performed to determine whether the ID is valid. If, after a number of tries, the wrong ID is received a beep is played informing the caller that the call is being terminated. When this occurs, an internal software control flag is generated which provides an indication to the software to update the data base to finish the call and to indicate an unsuccessful record. The playing of a "Good-bye" voice file indicates a successful call, in which case the data base is updated accordingly and the call is finished.

Upon entry into the "play beep" state 74, the "play beep entry" routine 106 is executed. This routine determines whether a beep should be played subsequent to the playing of a voice message which expects a DTMF response from the user. This routine also interfaces with and initializes the RWB fields in the DIALOGIC 4XX or 2XX hardware.

The "play beep exit" routine 108 comprises the exit function for the "play beep" state 74. If the caller has not entered DTMF (or rotary) information, a counter is incremented which maintains a count of the number of times a response has not been received. If a maximum count is reached, a flag (corresponding to event "TO" in FIG. 4A) is generated and the file is closed.

"Get DTMF Entry" is an entry routine 110 responsible for getting the DTMF data. It also updates the RWB buffers of the telephone I/O hardware 32. Termination conditions for user entered DTMFs are established. For ID and ADM inputs, reception of the DTMF data is terminated by either the number of digits or by a time out.

Routine 112, "Get DTMF exit", is the exit function for the "get DTMF data" state 72 and determines whether a time-out has occurred, by calling a routine named "CKTIMEOUT". This routine 112 also determines whether valid DTMF data, corresponding to an authorized ID access code, has been received. The routine 112 uses another routine named "IDAUTH" in checking the DTMF data. The "get DTMF exit" routine 112 also recognizes certain passwords which designate individuals having super access to the system, i.e., supervisory personnel or programmers or the like.

"Get Voice Entry" is an entry routine 116 responsible for getting the identification data. It also updates the RWB buffers of the telephone I/O hardware 32. Termination conditions for user entered identifications are established. For ID and ADM inputs, reception of the voice data is terminated by either the number of digits or by a time out.

Routine 115, "Get Voice Exit" is the exit function for the "Get Voice Data" state 114 and determines whether a time-out has occured, by calling a routine "CKTIMEOUT". This routine 115 also determines whether valid identification data, corresponding to an authorized ID access code, has been received. The routine 115 uses another routine named "IDAUTH" in checking identification data. The "Get Voice Exit" routine 115 also recognizes certain passwords which designate specific individuals having, for example, special access to the system.

The previously mentioned "CKTIMEOUT" routine checks whether more than a maximum number of seconds elapsed since entry of the expected number of DTMF digits began. In the case of a time-out, the voice file is played to request more DTMF digits or to reenter voice commands and another time-out is set.

"GETID" is a routine which is called after the ID code DTMF or voice data is received. The routine compares the received ID against ID reference data expected to accompany the previously received ANI data. When the routine notes an ID representing a privileged user, a special function is carried out to check for a necessary password. If the ID is that of an employee reporting from a work site and the ID agrees with the ANI data, the record is completed and a "complete" flag is set to "Yes". The software is then set to play the "good-bye" voice message. If an unexpected ID is received, a special procedure is performed in the software to check whether the ID is valid.

"IDAUTH", another software routine, compares incoming ID data against corresponding information stored in the data base 42. A special software function called "LOOKID" determines whether the ID is in the data base. If the ID is in the data base but does not match ANI data which should accompany it, the record is completed but an entry is made that the employee is not the assigned employee. Thereafter, the "good-bye" message is played. If the ID is not recognized, a special voice message is played asking the caller to enter an ID again.

Additional functions carried out by the program 36 include evaluating not only the calling number but also the called number. The system uses the called number to provide client services such as leaving a voice message, picking up a voice message, or both. The system uses the called number to segregate incoming telephone calls according to employers and to generate the reports 26 on the basis of employer preferences and specifications. That is, within certain limits, each subscriber is able to define the format and other criteria for its reports 26.

The program 36 further operates to periodically check a client data base and compare the expected calls with the received calls. Based upon such a comparison, the system provides the option of calling an employee at a work site to verify his/her presence. Employees that do not call in or whose presence at a work site has not been verified are later flagged in so-called "exception reports", i.e. reports which identify the no-show or the failed-to-call-in employee. The system uses this data to call failed-to-call-in employees and asks them to report their employer ID. The program 36 also preferably prompts an employee whose presence has been verified at the work site to enter, through the key pad 17, his/her arrival time.

As is characteristic of computer hardware, the computer 24 includes a system clock (not shown) and the program 36 periodically checks the system clock and determines when to transmit data to employers. When the software determines that it is the appropriate time to transmit the data, the software activates the communication software 56. The communication software dials the remotely located subscriber and determines if the subscriber is ready to receive information. If it is, the information is transmitted. If it is not, the program 36 will schedule the information to be transmitted at a next predetermined time. A standard, off-the-shelf communication software such as CLOSE-UP by Norton-Lambert, Inc. is used in the software 56 to transmit the data.

As previously noted, the program 36 will store both valid as well as invalid incoming telephone calls, i.e. calls containing invalid ANI or employee ID data. Later, the subscriber will receive an exception report of all invalid calls.

Timeclerk™ provides a data base system at the remote subscriber (client) site to those subscribers that require a system for collecting and reviewing the transmitted data and maintaining a schedule of employee arrival and departure times. The system provides the capability to add, update or delete employee schedules and update or delete transactions, and print reports by employer-client customers at a designated period of time. In other words, it provides the means for subscribers to identify and transmit to Timeclerk™ the specifications, parameters and conditions relating to their employee data base, work sites, conditions for accepting incoming telephone calls, layout and format of the reports 26 and the like.

The present invention preferably further includes (as part of the telephone I/O circuitry 32) means for digitizing and storing short voice messages. These messages are appended to the telephone call record. With the recent introduction of and increasing availability of ISDN services from the telephone companies, the capability of transmitting large amounts of digital data over telephone wires has become possible, enabling forwarding of digitized voice messages to employers. In this connection, the present invention contemplates to include a mode in which employees would be requested to enunciate a short, standard phrase to be included with and stored as an appendage to each telephone record, as a means for assuring that employees are not placing calls for one another.

The present invention further envisages that employees will call from cellular telephones. It is contemplated that future ANI protocols will include within the ANI data a portion designating the geographical location, i.e. "cell" from which the telephone call is originating. Such information will be used to determine the general geographical area from which a telephone call has been made and will serve a useful purpose in such fields as the trucking industry and the like.

In accordance with another feature of the invention, the reference information data base 40 also includes a map of the locations of the various public pay telephones. This will enable employees to register their arrival/departure times from nearby pay telephones, should the placement of calls from the actual work site not be possible or practical. In accordance with yet another embodiment, the computer system 24 is located to be reached through predesignated, toll-free 800 telephone numbers.

A further feature of the present invention permits the software program to associate a calling employee with his or her employer on the basis of the "called" number. That is, the system dedicates one or more distinct telephone numbers to each employer. This feature enables, among other things, generating unique reports 26 for each of a number of employers subscribing to the reporting service of the present invention.

The present invention provides many advantages and has applications in numerous fields. The ability of the present invention to provide virtually instant, complete, and computer ready records of employee work schedules permits such records to be automatically transferred to existing time billing systems. This enables immediate preparation of billing invoices. Since, in certain service industries governmental agencies and insurance companies often times reimburse service providers for the services, the more reliable and expeditious billing made possible by the present invention represents a significant financial advantage.

Figure 7:
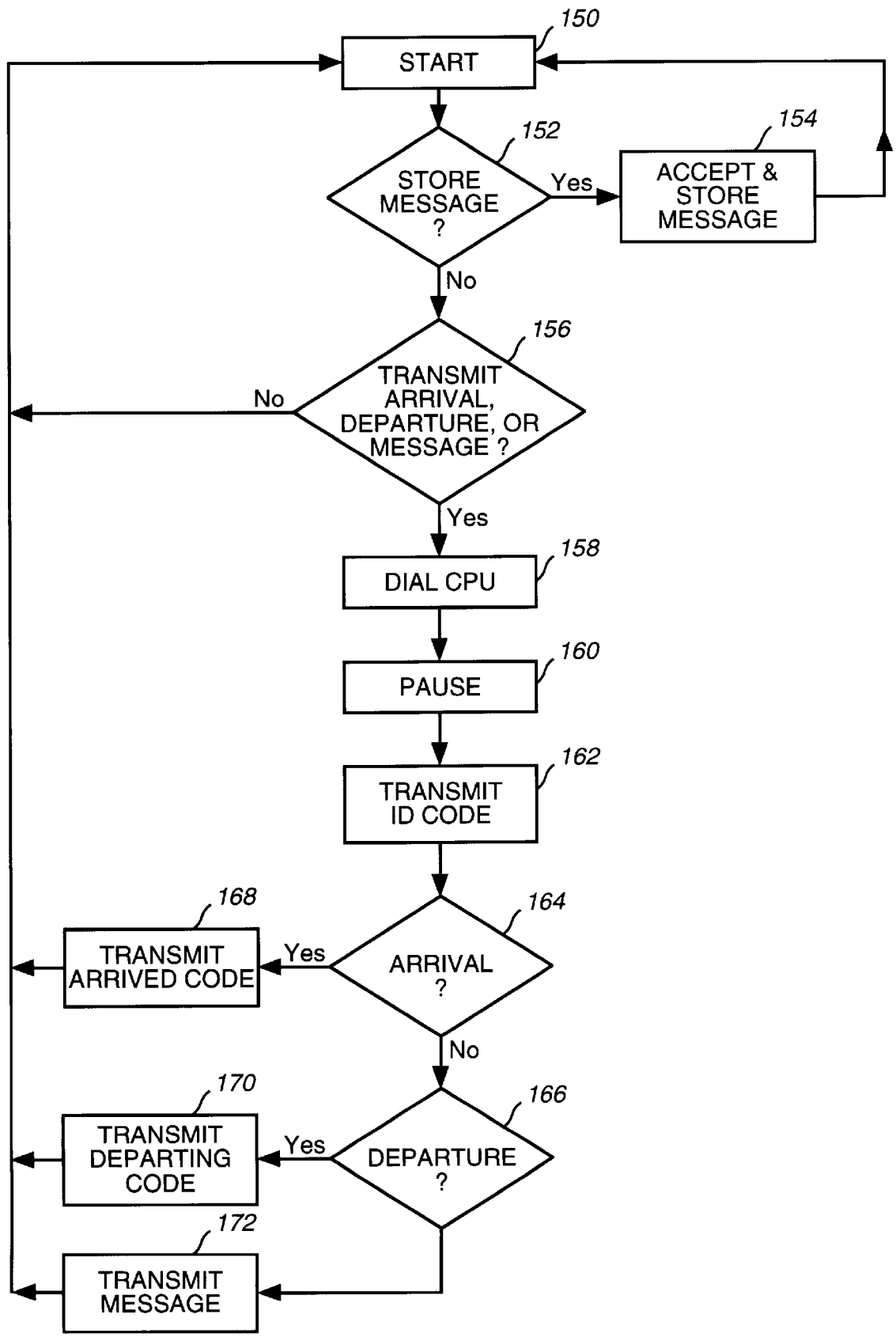
FIG. 7 is a flowchart of the secure accessing device of FIG. 6.

The concepts and systems of the present invention are also applicable to fields such as, auditing, i.e., accounting, computer security, home phone shopping, trucking, technical field service, funds transfer, insurance claims and payments, and the like. While the invention has been described above as requiring employees to enter information through telephone touch tone keypads, the present invention further contemplates, in accordance with FIGS. 6 and 7, that each employee will be provided with a secure computer accessing device 100 which will avoid the need to enter special access codes or even dial the telephone number of the central computer 24 or the use of voice activated commands. Referring to FIGS. 6 and 7, the device 100 comprises a housing 120 containing electronics 122 which include a tone generator receiver 124, a microcomputer 126 and a keyboard/push-button interface circuit 128. The housing 120 supports several push buttons including an "arrived" push-button 130, "departing" push button 132, "transmit message" push button 134, and "store message" push button 136. The housing 120 further supports an alphanumeric keyboard 138. A flexible cable 140 connects the electronics 122 with a speaker pad 142.

In operation, a field employee lifts the telephone 16, places the speaker pad 142 against the mouthpiece of the telephone and presses the "arrived" push button 130. The device 100 then automatically emits the necessary tones which dial up the computer 24.

The microcomputer 126 of FIG. 6 includes a software program which operates in accordance with the flow chart of FIG. 7. That is, normally the program is in a start state 150 in which general tasks relating to initializing and running of the software are carried out. The program enters the decisional step 152 periodically to determine whether the "store message" button 136 has been depressed. It is has, the program proceeds to the step 154 in which it accepts and stores a message entered through the keyboard 138.

If storage of a message has not been requested, the program enters decision step 156 to determine whether any of the other push buttons 130, 132, 134 has been depressed or if a voice command has been received. If they have not, the program returns to the start state 150. Otherwise, the following steps are executed. First, in the step 158, the telephone number of the computer system 24 is dialed and a pause (step 160) is interjected to enable the computer 24 to answer the call. Thereafter, the ID code is transmitted by the device 100 at step 162. The ID code of each device 100 is unique to that device. It serves to identify the employee to whom the device was issued.

At steps 164 and 166 it is determined which of the push-buttons 130, 132, and 134 has been pressed. If the "arrived" push-button 130 has been pressed, an appropriate function code, designating an "arrival", is transmitted at step 168. At step 170, a "departing" code is transmitted when this has been requested. Step 172 is activated when a user has requested to transmit a previously stored message.

The device 100 of FIG. 6 and 7 is preferably palm sized, to fit in the pocket or small handbag of an employee. The device 100 provides the following advantages. It relieves employees from having to memorize access codes, simplifies communications and avoids the problem of miscommunications arising from inaccurately entered codes. It reduces the chance that employees will be able to cover for one another through disclosure to fellow employees of their personal ID codes. The device 100 enables employees to compose and send to their employers short messages. While the device 100 includes a speaker pad 142, it could also include a second pad (not shown) for placement over the ear piece to enable the device 100 to interactively communicate (receive) messages from the computer 24.

In lieu of the device 100 of FIG. 6, i.e., the use of the key pad to key in codes, the present invention contemplates the use of voice recognition systems and methods for identifying the calling employee. One skilled in the art can easily obtain and is familiar with information describing the burgeoning technology in voice recognition systems. There is a large body of issued patents on the subject of inputting into a computer a voice sample of a person, digitizing the sample, and matching the sample to stored samples to identify spoken words. The body of patents on voice recognition is incorporated by reference herein.

In any case, the present invention also contemplates the recognition of an employee by the employee uttering a simple message, which when transmitted to the central computer of the present invention can be analyzed to derive therefore various patterns and characteristics unique to the particular employee to identify the same.

Further the device 100 can be provided with a glass window optical reader at which the employee may place a finger or a thumb. Under the window there is provided a small, minute optical reader which reads the finger print of the employee and transmits information characterizing the same to the central computer for identifying the particular employee by matching the received data (or a check sum or other representations thereof) against data prestored in the system.

Biometrics is another advantageous method of automated personal identification. Biometric systems are automated methods of verifying or recognizing the identity of a living person on the basis of some physiological characteristic, such as a fingerprint, iris pattern, or some aspect of behavior, such as handwriting or keystroke patterns. It is envisioned that such biometric systems can be provided for recognition of an employee. In particular, a signature identifying system is contemplated as being advantageous for use in the present invention.

Figure 8:
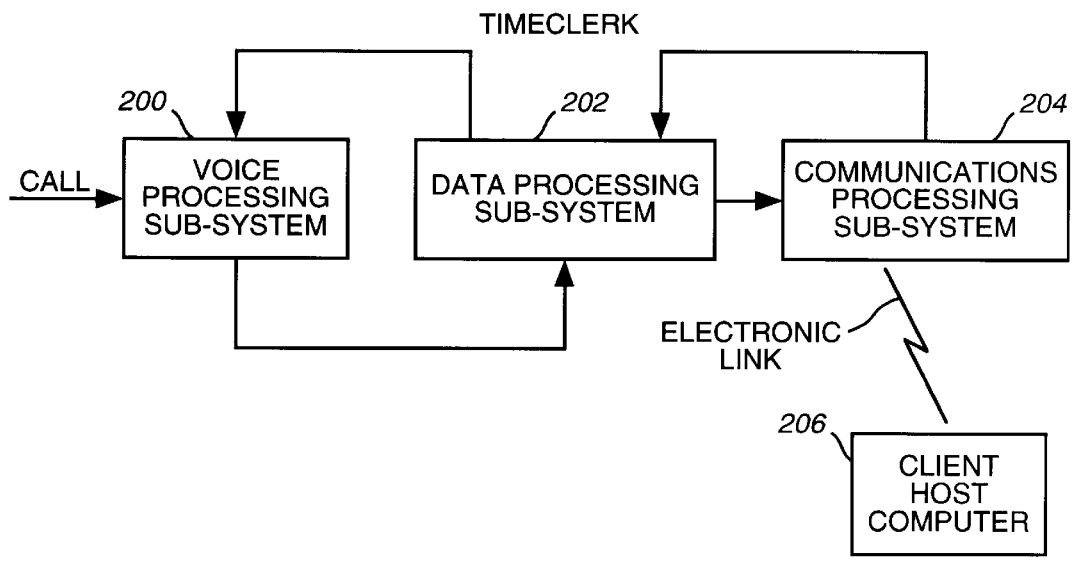
FIGS. 8–17 are software flow charts of the present invention.
Figure 10:
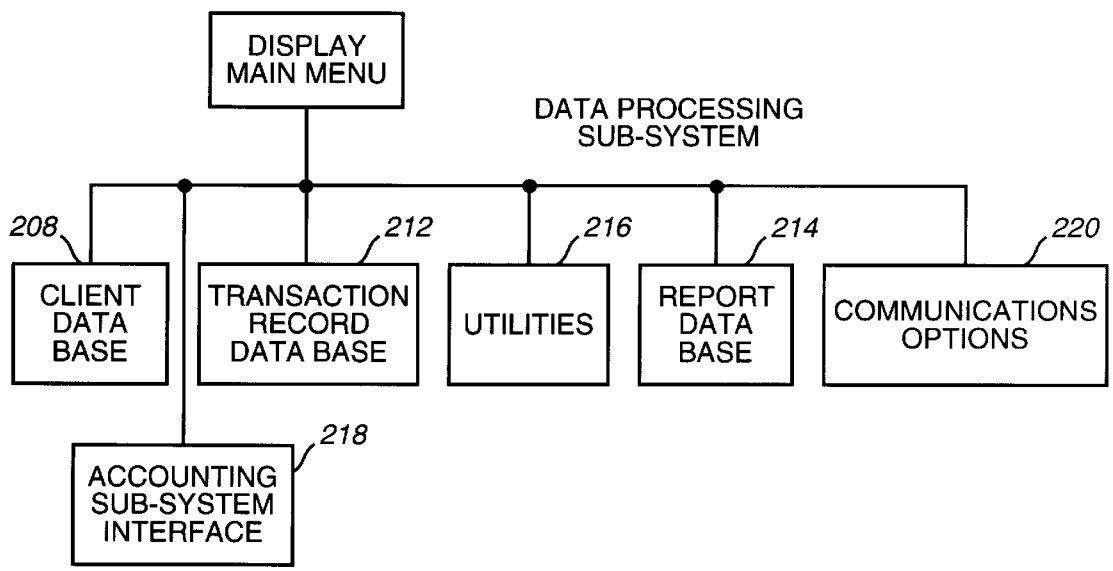
Figure 9:
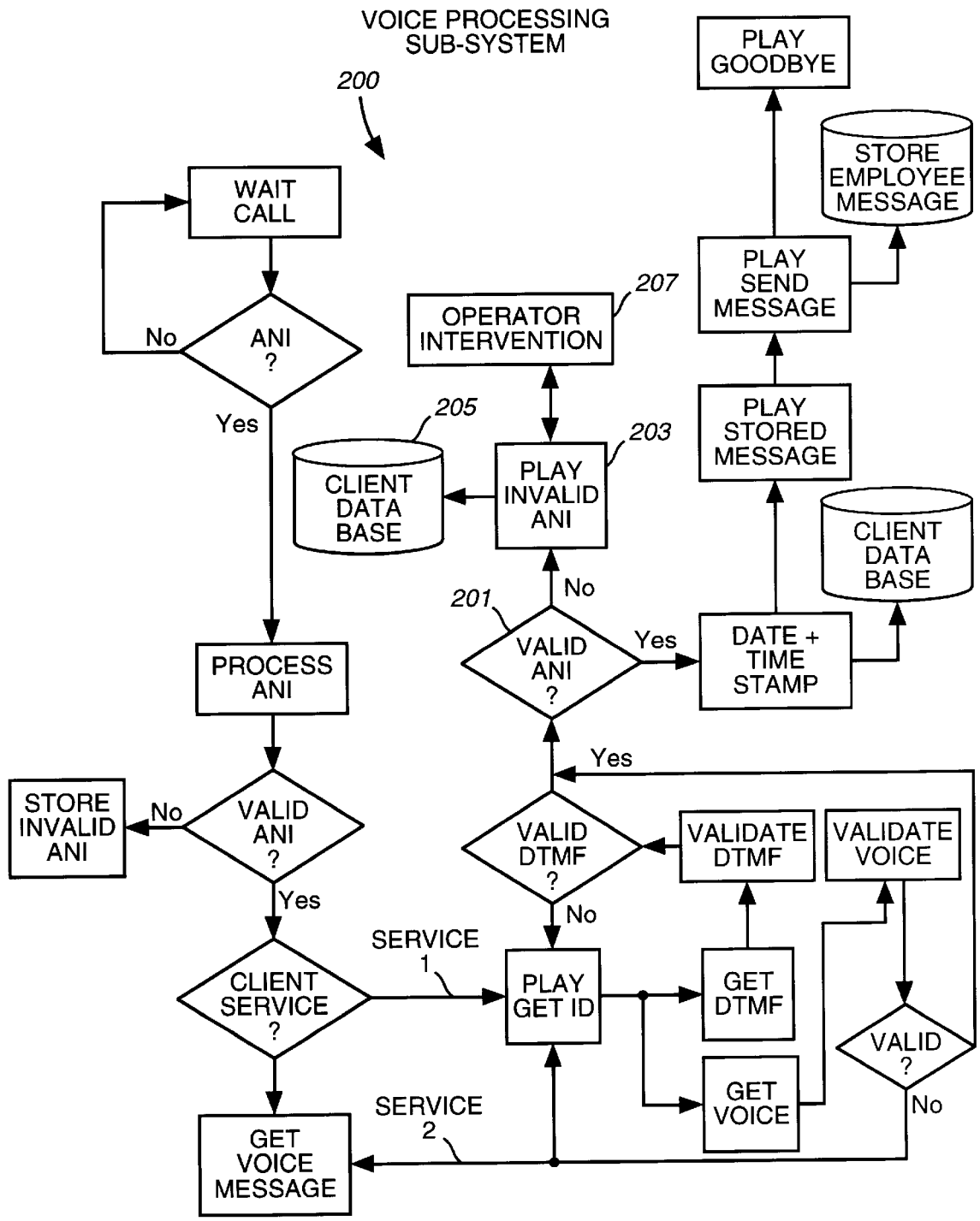
Figure 11:
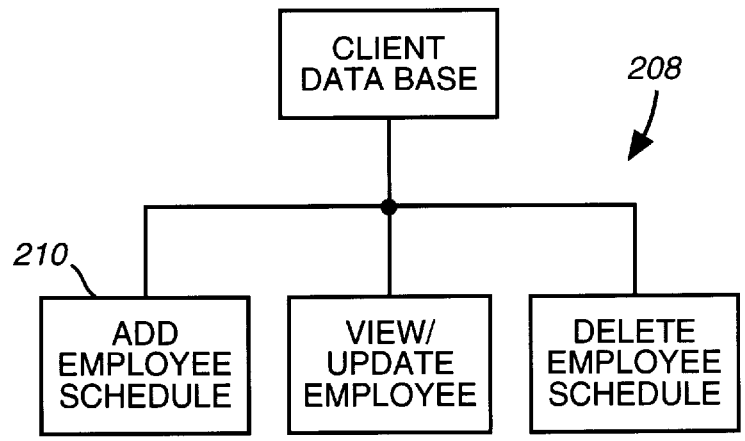
Figure 12:
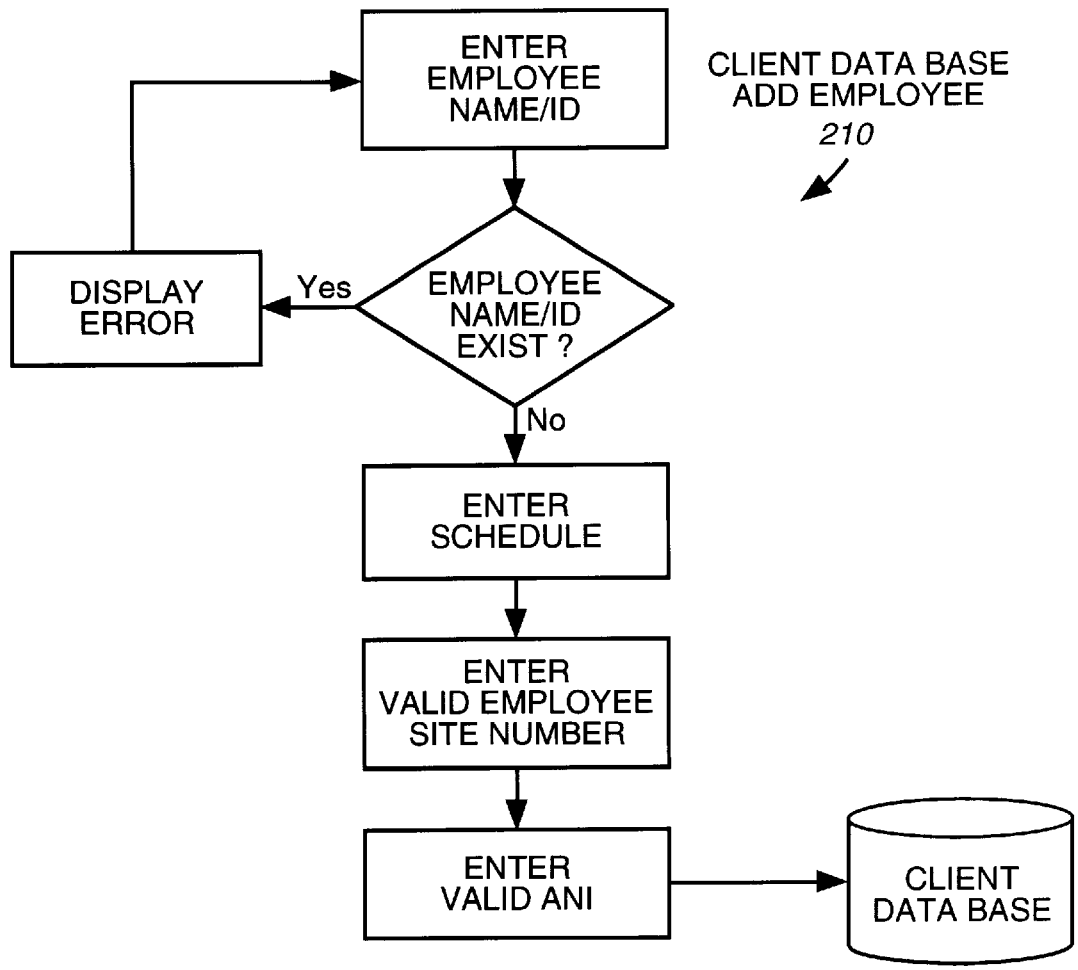
Figure 13:
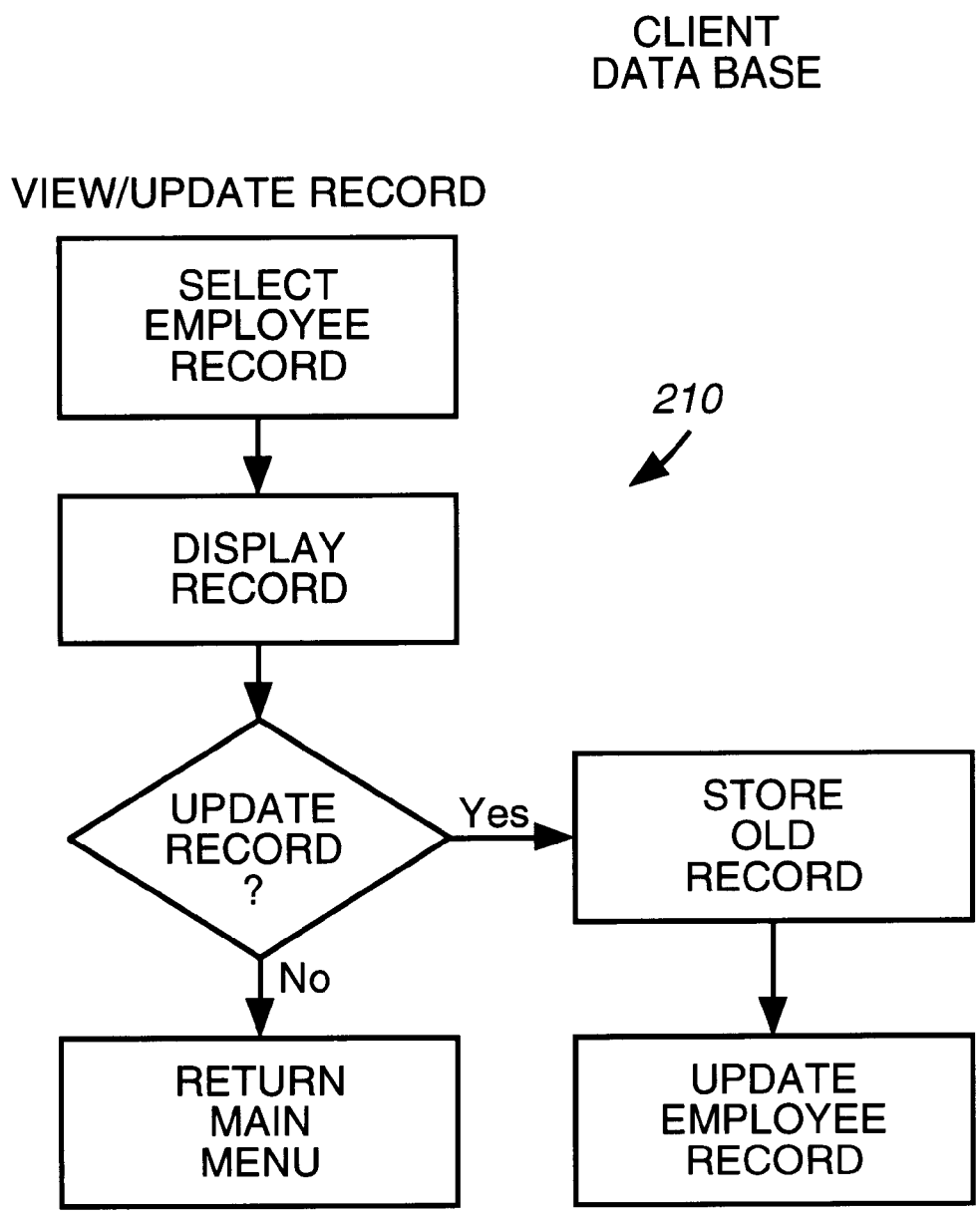
Figure 14:
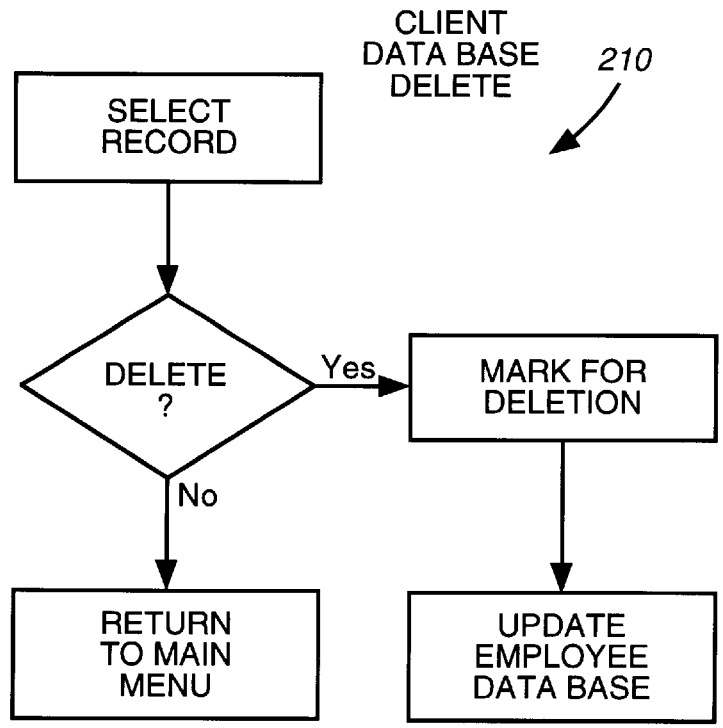

For completeness, FIGS. 8–17 have been provided as additional flow charts which define the various functions and processes of the Timeclerk™ system. Briefly, the program 36 is essentially divided into three main parts including a voice processing subsystem 200, a data processing subsystem 202 and a communication processing subsystem 204. A client host computer 206 communicates via asynchronous, synchronous or wide-area network (WAN) communication links with the communications processing subsystem 204 of Timeclerk™ (FIG. 8). FIG. 9 shows a self-explanatory flow chart of the voice processing subsystem 200. It is worth noting with respect to FIG. 9 that, if an invalid ANI is detected at the flow chart step 20, this fact is stored in an exception report. See steps 203 and 205. In addition, Timeclerk™ also provides the option of connecting the employee directly to his/her employer, as denoted by the step 207. In this manner, the employee can explain to the employer directly and immediately why he or she is not at the prescheduled work site. FIG. 10 defines the main components of the data processing subsystem 202. These include a client data base 208, a transaction record data base 212, a utilities program 216, a report data base 214, a communications options block 220 and an accounting subsystem interface 218. The main components of the client data base 208 are shown in FIG. 11 and these include an add-employee schedule routine 210. FIGS. 12, 13 and 14 show further components of the add-employee schedule routine 210.

Figure 15:
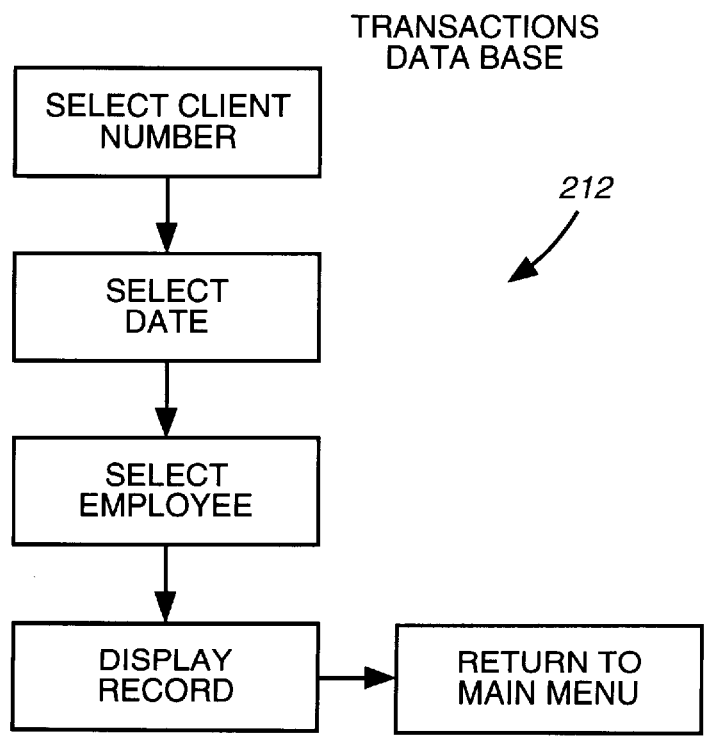
Figure 16:
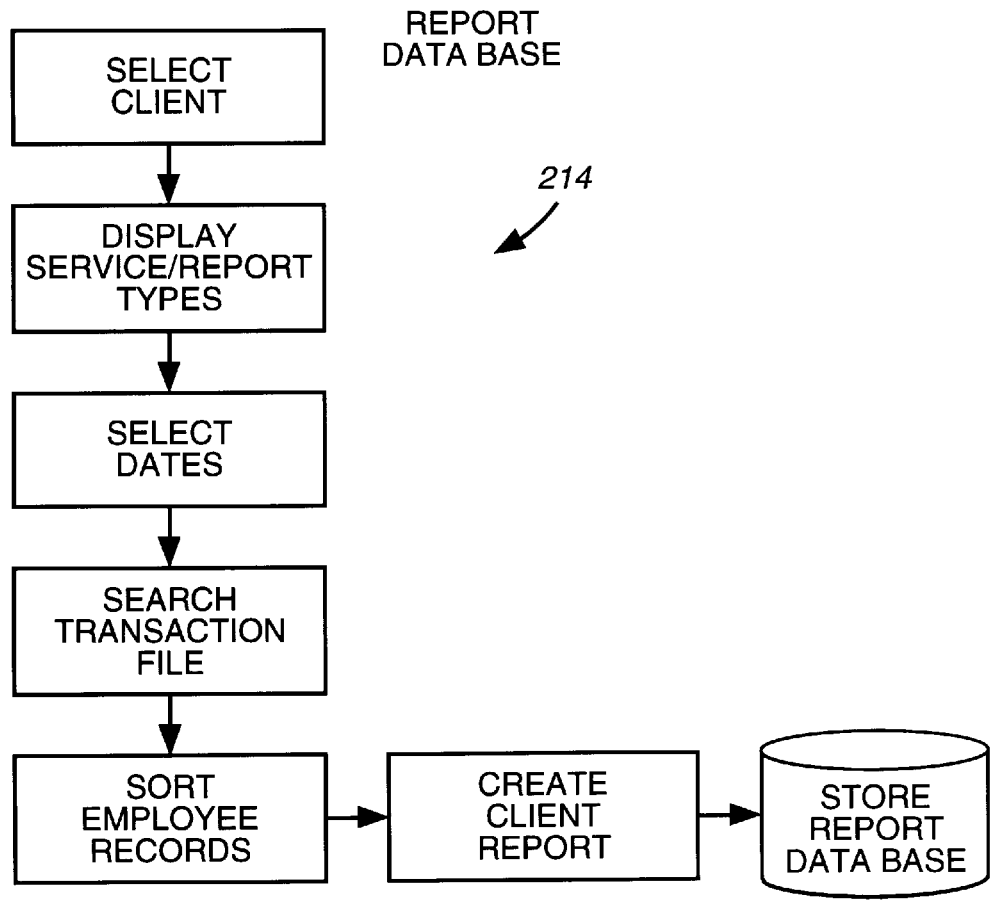
Figure 17:
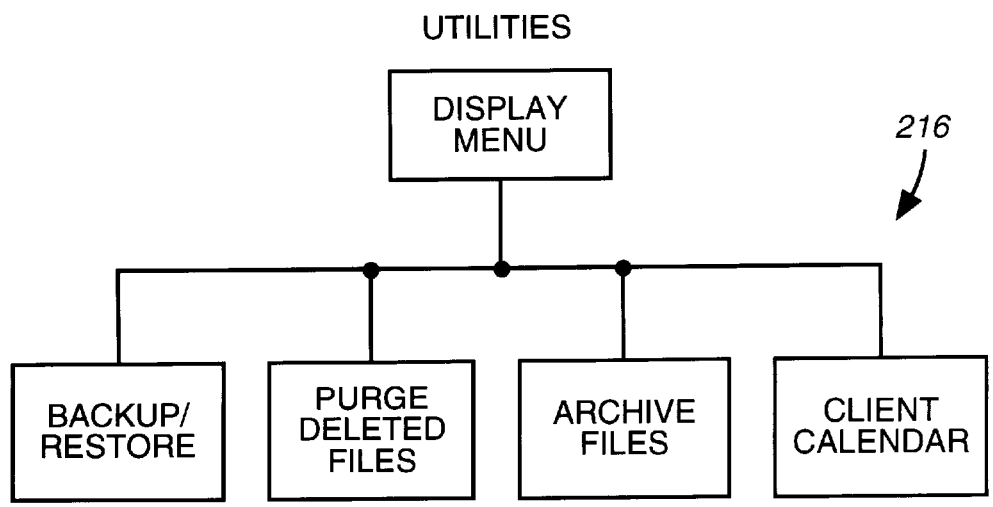

The main software functions associated with transaction data base 212 are depicted in FIG. 15. FIG. 16 is a self-explanatory flow chart of the main constituents of the report data base 214. The utilities portion 216 of the program is illustrated by way of the flow chart of FIG. 17.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of tracking employees and generating employee reports, the method comprising:
   receiving telephone calls by a computer system from calling telephones located at various work sites;
   detecting data which precedes the telephone calls that indicates the calling number;
   receiving from the calling telephones employee identification codes, wherein each code identifies a respective calling employee;
   providing an employee identification code data base containing valid employee codes;
   verifying the employee identification codes being received from the calling telephones against the valid employee identification codes stored in the employee identification code data base;
   creating telephone call records of incoming calls and stamping each said telephone call record with a time; and
   generating a report containing information contained in said telephone call records.

2. The method of tracking employees and generating employee reports of claim 1, wherein said detected data is in the form of automatic Number Identification (ANI) data.

3. The method of tracking employees and generating employee reports of claim 1, wherein said generated report defines for each given telephone call record the location from which the telephone call record was received based on the ANI data associated with the given telephone call record, the time of the telephone call and the identity of the employee.

4. The method of tracking employees and generating employee reports of claim 1, further including the step of stamping each said telephone call record with a date.

5. The method of tracking employees and generating employee reports of claim 1, wherein said generated report defines for each given telephone call record the location from which the telephone call record was received based on the ANI data associated with the given telephone call record, the time and date of the telephone call and the identity of the employee; and said detected data is in the form of Automatic Number Identification (ANI) data.

6. The method of tracking employees and generating employee reports of claim 4, further comprising the step of receiving additional data from the calling telephones.

7. The method of tracking employees and generating employee reports of claim 4, wherein said step of verifying employee identification codes occurs after the completion of said incoming call.

8. The method of tracking employees and generating employee reports of claim 4, further comprising the steps of providing a scheduling database; and comparing said received employee identification code against said scheduling database.

9. The method of tracking employees and generating employee reports of claim 4, further comprising the step of recording voice messages for later retrieval.

10. A system for tracking employees and generating employee reports, comprising:
    a computer system;
    means for coupling said computer system to a telephone network;
    means for receiving telephone calls by said computer system from calling telephones located at various work sites;
    means for detecting data which precedes the telephone calls that indicates the calling number;
    means for receiving from the calling telephones employee identification codes, wherein each code identifies a respective calling employee;
    an employee identification code data base containing valid employee codes;
    means for verifying the employee identification codes being received from the calling telephones against the valid employee identification codes stored in the employee identification code data base;
    means for creating telephone call records of incoming calls and stamping each said telephone call record with a time; and
    means for generating a report containing information contained in said telephone call records.

11. The system for tracking employees and generating employee reports of claim 10, wherein said detected data is in the form of Automatic Number Identification (ANI) data.

12. The system for tracking employees and generating employee reports of claim 10, wherein said generated report defines for each given telephone call record the location from which the telephone call record was received based on the ANI data associated with the given telephone call record, the time of the telephone call and the identity of the employee.

13. The system for tracking employees and generating employee reports of claim 10, further including means for stamping each said telephone call record with a date.

14. The system for tracking employees and generating employee reports of claim 10, wherein said generated report defines for each given telephone call record the location from which the telephone call record was received based on the ANI data associated with the given telephone call record, the time and date of the telephone call and the identity of the employee; and said detected data is in the form of Automatic Number Identification (ANI) data.

15. The system for tracking employees and generating employee reports of claim 13, further comprising means for receiving additional data from the calling telephones.

16. The system for tracking employees and generating employee reports of claim 13, further comprising means for providing a scheduling database; and means for comparing said received employee identification code against said scheduling database.

17. The system for tracking employees and generating employee reports of claim 13, further comprising means for recording voice messages for later retrieval.

* * * * *

(«12») EX PARTE REEXAMINATION CERTIFICATE (9012th)

United States Patent
Katz

(10) Number: US 5,963,912 C1
(45) Certificate Issued: *May 15, 2012

(54) TELEPHONE-BASED PERSONNEL TRACKING SYSTEM

(75) Inventor: Penina Katz, Flushing, NY (US)

(73) Assignee: TD Bank, N.A., Melville, NY (US)

Reexamination Request:
No. 90/011,350, Nov. 22, 2010

Reexamination Certificate for:
Patent No.: 5,963,912
Issued: Oct. 5, 1999
Appl. No.: 08/728,921
Filed: Oct. 11, 1996

( * ) Notice: This patent is subject to a terminal disclaimer.

Related U.S. Application Data

(60) Continuation of application No. 08/306,301, filed on Sep. 14, 1994, now Pat. No. 5,646,839, and a continuation-in-part of application No. 08/091,758, filed on Jul. 14, 1993, now abandoned, which is a division of application No. 07/529,894, filed on May 29, 1990, now Pat. No. 5,255,183.

(51) Int. Cl.
*G06Q 10/00* (2006.01)
*G07C 1/00* (2006.01)
*G07C 1/10* (2006.01)
*G06F 11/30* (2006.01)
*H04M 3/533* (2006.01)
*H04M 3/50* (2006.01)
*H04M 3/36* (2006.01)
*H04M 3/42* (2006.01)
*H04M 3/38* (2006.01)
*H04Q 3/72* (2006.01)

(52) U.S. Cl. ........................ 705/32; 379/88.21; 379/913; 714/E11.179

(58) Field of Classification Search ........................ 705/7
See application file for complete search history.

(56) References Cited

To view the complete listing of prior art documents cited during the proceeding for Reexamination Control Number 90/011,350, please refer to the USPTO's public Patent Application Information Retrieval (PAIR) system under the Display References tab.

*Primary Examiner* — Jeffrey Carlson

(57) ABSTRACT

A computer system includes hardware for interfacing with the public telephone network and for accepting incoming telephone calls. The computer system detects from the incoming telephone calls automatic number identification data (ANI data), such as Caller-ID data, which identifies the calling telephone and further accepts personal identification codes from the caller. The system generates reports of the incoming telephone calls in which reports the location of the calling telephone is correlated with the person who is making the telephone call. Preferably, the system is applied for recording remotely, through the telephone network, the arrival and departure times of field based employees at various work sites.

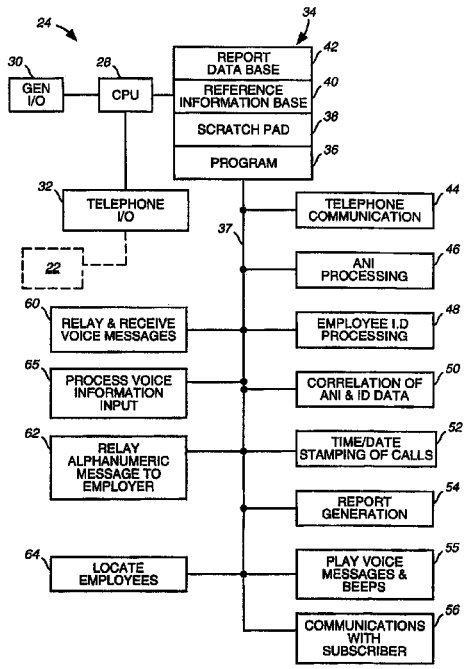

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-17 are cancelled.

* * * * *